(12) United States Patent  
MacDougall et al.

(10) Patent No.: US 9,335,224 B2  
(45) Date of Patent: May 10, 2016

(54) HIGH TEMPERATURE FIBER OPTIC TURNAROUND

(75) Inventors: Trevor Wayne MacDougall, Simsbury, CT (US); Paul Eric Sanders, Madison, CT (US)

(73) Assignee: QOREX LLC, Rocky Hill, CT (US)

( * ) Notice: Subject to any disclaimer, the term of this patent is extended or adjusted under 35 U.S.C. 154(b) by 982 days.

(21) Appl. No.: 13/208,910

(22) Filed: Aug. 12, 2011

(65) Prior Publication Data

US 2012/0039561 A1    Feb. 16, 2012

Related U.S. Application Data

(60) Provisional application No. 61/373,349, filed on Aug. 13, 2010, provisional application No. 61/373,364, filed on Aug. 13, 2010, provisional application No. 61/373,394, filed on Aug. 13, 2010, provisional application No. 61/373,442, filed on Aug. 13, 2010.

(51) Int. Cl.  
*G01K 11/32* (2006.01)  
*G02B 6/38* (2006.01)  
*G02B 6/44* (2006.01)

(52) U.S. Cl.  
CPC .............. *G01K 11/32* (2013.01); *G02B 6/3827* (2013.01); *G01K 2011/324* (2013.01); *G02B 6/4492* (2013.01)

(58) Field of Classification Search  
CPC ...................................................... G02B 6/3827  
See application file for complete search history.

(56) References Cited

U.S. PATENT DOCUMENTS

| | | | |
|---|---|---|---|
| 7,269,320 B2 * | 9/2007 | Herbst ........................... | 385/100 |
| 7,494,289 B1 * | 2/2009 | Chen ............................... | 385/99 |
| 7,603,009 B2 * | 10/2009 | Ramos ............................ | 385/47 |
| 7,773,841 B2 * | 8/2010 | Varadarajan et al. ........... | 385/32 |

* cited by examiner

*Primary Examiner* — Uyen Chau N Le  
*Assistant Examiner* — John M Bedtelyon  
(74) *Attorney, Agent, or Firm* — Grogan, Tuccillo & Vanderleeden, LLP

(57) ABSTRACT

A sensing cable includes a pair of sensing fibers that are connected to one another by a U-shaped turnaround section. The turnaround section is a section of sensing fiber coated with a jacket that includes metallic components. The turnaround section is bent and, then, annealed according to a method of the present invention. The turnaround section is robust and reduced in size (i.e., radius). The sensing cable also includes an inner sleeve that surrounds the sensing fibers and an elongated outer armor casing (i.e., including an armor tube and a sealing cap) that encases a terminating end thereof. The armor tube and the sealing cap protect the sensing fiber from mechanical and chemical harm, are reduced in size and facilitate insertion of the sensing cable into downhole environments. The sensing cable has improved operating range up to 300° C.

19 Claims, 3 Drawing Sheets

HIGH TEMPERATURE FIBER OPTIC TURNAROUND

CROSS REFERENCE TO RELATED PATENT DOCUMENTS

The present application is a non-provisional of and claims the benefit of U.S. patent application Ser. No. 61/373,349 to MacDougall et al., and incorporates the following patent documents by reference: U.S. patent application Ser. No. 61/373,364 to MacDougall et al., entitled "METHOD FOR PERFORMING OPTICAL DISTRIBUTED TEMPERATURE SENSING (DTS) MEASUREMENTS IN HYDROGEN ENVIRONMENTS"; U.S. patent application Ser. No. 61/373,394 to MacDougall et al., entitled "PASSIVATION OF OPTICAL SENSING FIBERS"; and U.S. patent application Ser. No. 61/373,442 to MacDougall et al., entitled "LOW PROFILE, HIGH TEMPERATURE, HYDROGEN TOLERANT OPTICAL SENSING CABLE".

FIELD OF THE INVENTION

The present invention generally relates to an optical sensing fiber cable and, more specifically, to a high temperature optical sensing fiber with an annealed turnaround and a casing, and a method of producing the same.

BACKGROUND OF THE INVENTION

Optical fibers are used in a wide array of fields, for example, to transmit information in the context of telecommunications and to act as a sensing medium in the context of sensors, such as oil well temperature sensing. In many applications, there is a need to send a light signal that is propagating in an optical fiber around a tight bend. For instance, the optical fiber may be formed to include a substantially 180° turnaround. In order to form the turnaround, a great deal of stress is placed on the bent fiber section. Between the stress of bending the fiber and the bend itself, the fiber often suffers from material integrity and optical loss issues.

To, at least, partially, address the issue of material integrity, the bent fiber section is often packaged or otherwise encased to prevent subsequent contact that could further weaken the fiber. However, the packaging or encasing process often occurs at high temperatures, which compounds the issues of material integrity and optical loss. In addition, the fiber may be utilized in an environment in which high operating temperatures further compound the issues of material integrity and optical loss, and degrade the operating life of the sensing fiber.

One approach known in the art uses low temperature fiber optic components and, thereby, avoids high temperatures during both manufacturing and operation. For instance, according to U.S. Pat. No. 7,269,320, which is directed to AFL Telecommunication's "Mini-Bend" device, the fiber is stretched under low-to-moderate heat to reduce the diameter of the glass structure of the core of the fiber, bent to form the turnaround and potted to protect the bent fiber section. However, the low temperature fiber optic approach has a limited operating range, the packaging (i.e., the potting) is fragile and the fiber, thus, remains sensitive to shock and vibration.

Another solution places a splice box at the end of a dual-fiber fiber optic cable in order to accommodate a splice between the two fibers to create the loop. The splice box is, typically, a mechanical package that is much larger than the cable creating mechanical interference issues when the cable is installed downhole, such as in an oil well. The splice box also requires a high temperature pressure seal to block the ingress of fluids and gases in the downhole environment.

Another solution bends an optical fiber and anneals the bent optical fiber to remove strain caused by the bending process. For instance, U.S. Pat. No. 4,812,001 discloses a method of bending an optical fiber against a cylindrically-shaped cartridge heater to form a 90° elbow-shaped turn. The temperature of the heater is elevated to simultaneously soften and annealed the glass (i.e., within seconds or minutes). However, the disclosed method is limited to making approximately 90° turns. In addition the heater only anneals the glass immediately proximate the bending surface of the heater and does not address strain at the remote ends of the optical fiber.

The object of the present invention is, therefore, to provide a sensing cable with a turnaround, which, among other desirable attributes, significantly reduces or overcomes the above-mentioned deficiencies of prior sensing cables.

SUMMARY OF THE INVENTION

In an aspect of the present invention, a sensing cable is provided that includes a pair of sensing fibers that are connected to one another by a U-shaped turnaround section that is spliced therebetween. The turnaround section is a section of sensing fiber coated with a jacket including a metallic component. The turnaround section is bent and annealed according to a method of the present invention.

In another aspect of the present invention, a sensing cable is provided that includes sensing fibers having ends, a turnaround section spliced to the ends of the sensing fibers, an inner sleeve mounted to the sensing fiber and the turnaround section and having a terminating end in the area of the turnaround section, and an elongated outer armor casing, including an outer armor tube and a sealing cap, that encases the terminating end of the inner sleeve. The connections between the inner sleeve, the armor tube and the sealing cap are welded, which provides a robust pressure barrier. In addition, due to the compact size of the turnaround section, the size of the elongated armor casing can be decreased, which facilitates seamless install into downhole environments.

In another aspect of the present invention, a method of treating sensing fibers is provided. The method bends the sensing fiber and, then, anneals the sensing fiber to reduce or eliminate stress levels typically found with bent fibers. By relieving the high stress condition, the mechanical reliability and operating lifetime of the component is dramatically improved. In addition, the minimum radius of the bend can be reduced.

It is an object of the present invention to provide a sensing cable that: is capable of performance up to 300° C.; is small in size and capable of seamless installation into downhole environment, for instance, the armor casing has a diameter less than ½"; has improved mechanical reliability; has improved operating lifetime; and has a robust pressure barrier.

These and other features of the present invention are described with reference to the drawings of preferred embodiments of the sensing cable with turnaround.

BRIEF DESCRIPTION OF THE DRAWINGS

The illustrated embodiments of the sensing cable with turnaround of the present invention are intended to illustrate, but not limit, the invention.

DETAILED DESCRIPTION OF THE PREFERRED EMBODIMENTS

Figure 1:
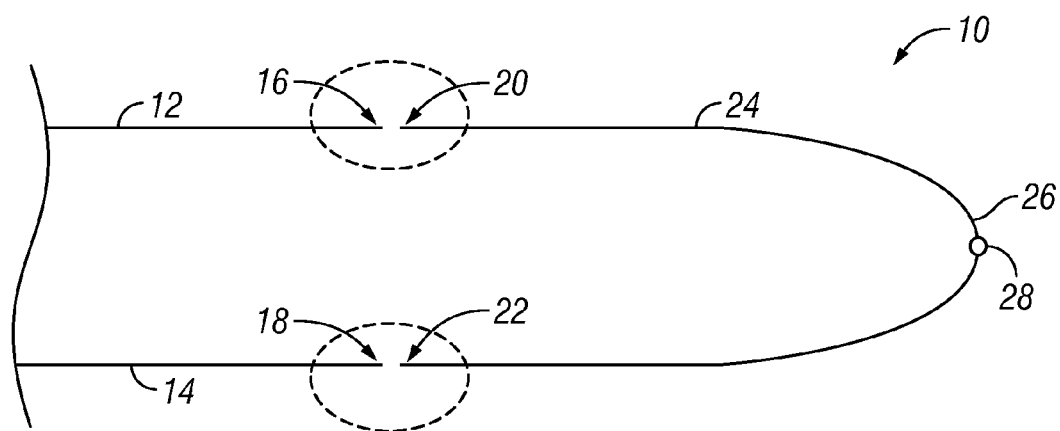
FIG. 1 is a schematic of a sensing fiber assembly according to one embodiment of the present invention.

Referring to FIG. 1, the end portion of a sensing fiber assembly 10 is shown. The sensing fiber assembly 10 includes a pair of sensing fibers 12, 14 that run substantially parallel to one another and culminate in a substantially aligned pair of ends 16, 18. Each end 16, 18 is spliced to a pair of corresponding ends 20, 22 of a turnaround section 24. The joining of the sensing fibers 12, 14 via the turnaround section 24 creates a complete optical path down a first fiber 12, through the turnaround section 24 and back through the second fiber 14.

The turnaround section 24 includes a bend 26. The bend 26 has a small-radius (e.g., having a radius of between 0.05 and 0.200 inches and, in some embodiments, 0.1 inches), is U-shaped and forms an angle of substantially 180°. In some embodiments, the bend 26 is substantially elliptically shaped.

In some embodiments, the turnaround section 24 has a modal filter 28 formed integrally therein. The modal filter 28 selectively blocks, attenuates or allows defined bands of light to pass therethrough.

Figure 2:
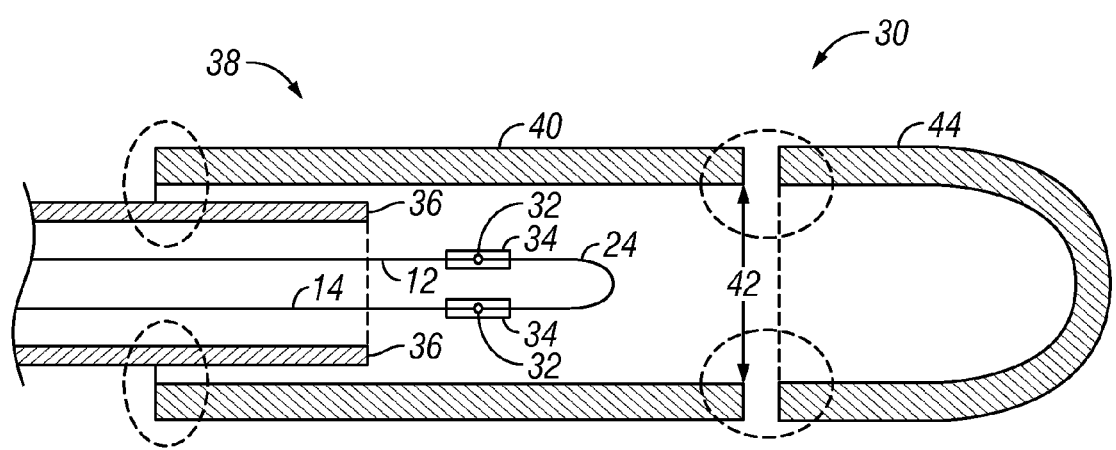
FIG. 2 is a schematic of a cross section of a sensing cable including a sensing fiber assembly, an inner sleeve and an elongated outer armor casing according to one embodiment of the present invention.

Referring to FIG. 2, a cross section of a sensing cable 30 is shown. The sensing cable 30 includes the sensing fibers 12, 14 connected to the turnaround section 24 via fusion splices at splice junctions 32, 32. The splice junctions 32, 32 are sealed by a pair of high temperature splice protectors 34, 34 that are heat-shrunk about the ends 16, 18, 20, 22 of the sensing fibers 12, 14 and the turnaround section 24.

An inner sleeve 36, such as a metal tube, is mounted to the sensing fibers 12, 14 and positioned up the length of the sensing fibers 12, 14, slightly away from the ends 16, 18 thereof. The inner sleeve 36 runs along the length of the sensing fibers 12, 14 to the remote end thereof. In certain embodiments the sensing fibers are provided with excess length or slack inside the inner sleeve 36, to mitigate strain that otherwise would be induced in the fibers by thermal cycling.

An elongated outer armor casing 38 is welded to the inner sleeve 36 toward a terminating end of the sensing fibers 12, 14 (i.e., near the ends 16, 18 thereof). The casing 38 includes an outer armor tube 40, which is a cylindrical tube having a diameter between 0.10 and 0.50 inches, and, in some embodiments, 0.25 inches. The outer armor tube 40 is welded to the inner sleeve 36 toward the remote end thereof (i.e., slightly away from the ends 16, 18 of the sensing fibers 12, 14). The terminating end of the armor tube 40 defines an opening 42 that is positioned to extend beyond the tip of the bend 26 of the sensing fibers 12, 14. The casing 38 also includes a sealing cap 44 that is welded to seal the opening 42 of the armor tube 40 and form a rugged barrier around the sensing fiber assembly 10.

In the opposing direction, the remote end of the armor tube 40 is welded to the inner sleeve 36, forming a sealed barrier around the sensing fiber assembly 10.

The components of the sensing cable 30 are made of high temperature materials. In some embodiments, the glass of the sensing fibers 12, 14 is made of pure silica; the inner sleeve 36, the armor tube 40 and the sealing cap 44 are each made of stainless steel; and the coatings on the sensing fibers 12, 14 and the high temperature splice protectors 34, 34 are made of a high temperature polymer, such as polyimide and acrylate. In certain embodiments, fluorinated polyimides may be used.

The turnaround section 24 is also made of high temperature materials. In particular, the turnaround section 24 is made of an optical fiber having a pure silica core, a reflective cladding and a jacket that includes a metallic component, such as gold, silver or copper. In some embodiments, the jacket is entirely made of an inert metal, such as gold, silver or copper. Alternatively, the jacket can be made of a polyimide coating that includes the inert metal as the metallic component. The optical fiber is treated according to a method of the present invention, as discussed in greater detail below, to form the turnaround section 24.

Once the sensing cable 30 is assembled and sealed, the sensing cable 30 can be used for communication and downhole sensing. For instance, in distributed temperature sensing of oil wells, the terminating end of the sensing cable 30 (i.e., the tip with the sealing cap 44 affixed thereto) is fed into an oil well. The remote end of the sensing cable 30, which includes exposed ends of the sensing fibers 12, 14 and is retained outside of the oil well, has an optical sensing device attached thereto. The optical sensing device, such as a distributed temperature sensing (DTS) interrogator, transmits light signals down the length of one or both sensing fibers 12, 14 and measures the received light at one or both sensing fibers 12, 14. For example, an optical sensing device and sensing method is described in U.S. application Ser. No. 61/373,364, which is incorporated herein by reference.

Figure 3:
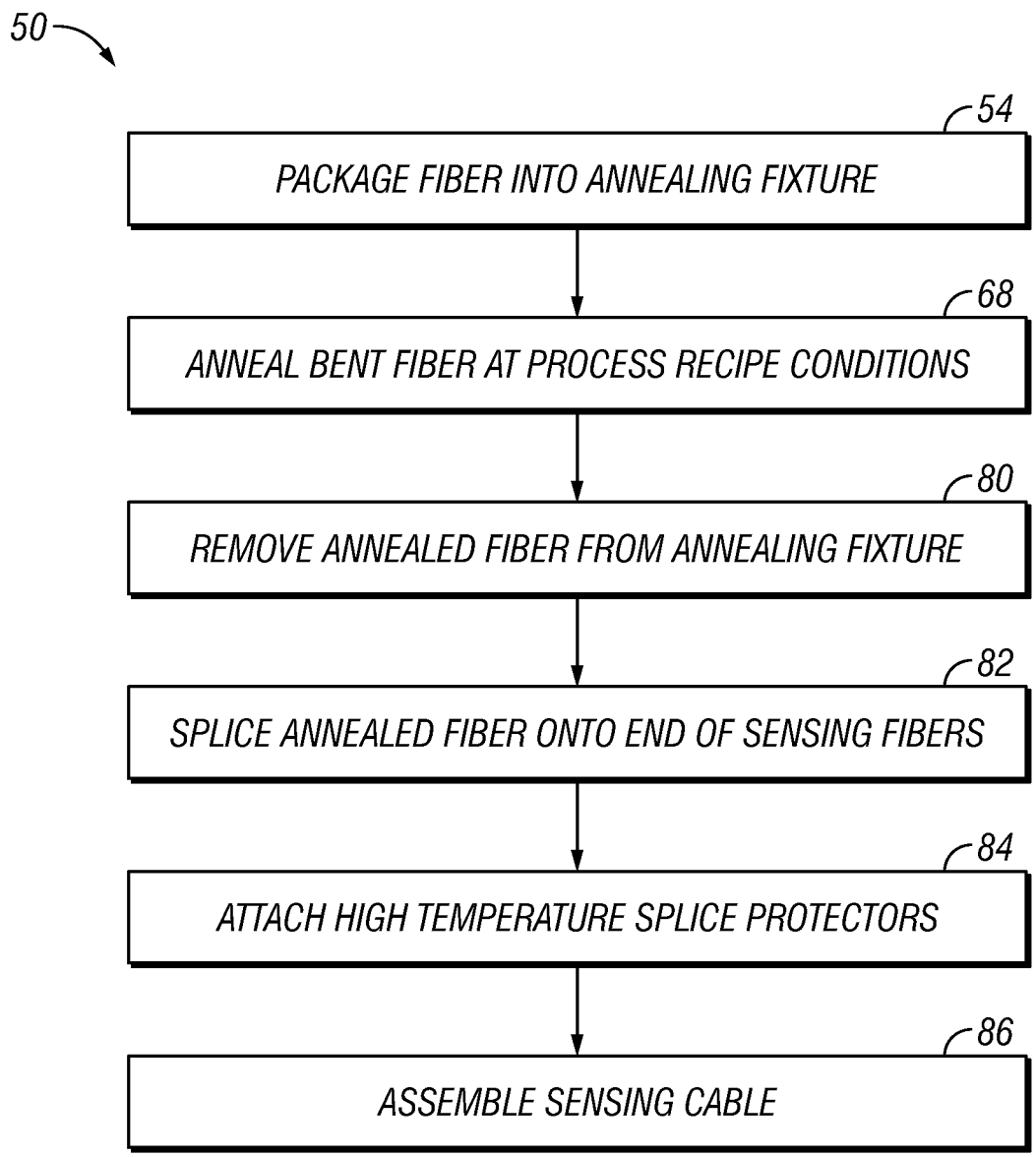
FIG. 3 illustrates a flow chart of a method of producing the turnaround section of FIG. 1 according to one embodiment of the present invention.

Referring to FIG. 3, a method 50 of treating an optical fiber 52 to form the turnaround section 24 (see FIGS. 1-2) and assembling the sensing cable 30 (see FIG. 2) is shown.

Figure 4:
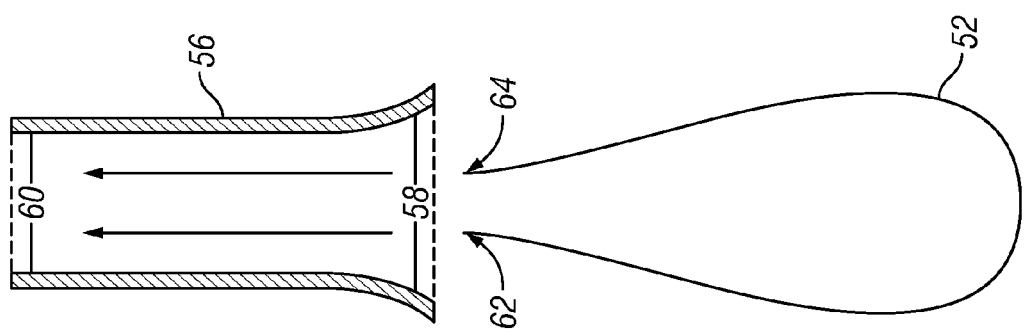
FIG. 4 illustrates a method of packaging a section of sensing fiber into an annealing fixture according to one embodiment of the present invention.

At step 54, the optical fiber 52 is packaged into an annealing fixture 56. Referring to FIG. 4, the annealing fixture 56 is a cylindrical tube having a fluted mouth 58 and a distal opening 60. The annealing fixture 56 is made of a high temperature material, such as quartz. The optical fiber 52 is a section of fiber having a jacket that includes a metallic component, as discussed above. The optical fiber 52 can be short, such as 1 inch, but is, in some embodiments, 7-15 inches in length to facilitate handling.

Ends 62, 64 of the optical fiber 52 are fed (i.e., as represented by the arrows in FIG. 4) into the fluted mouth 58 of the annealing fixture 56 and drawn through the distal opening 60. Then, the ends 62, 64 of the optical fiber 52, which are protruding from the distal opening 60, are pulled to draw a loop portion 66 of the optical fiber 52 into the annealing fixture 56. As the loop portion 66 is drawn closer to and, finally, into the annealing fixture 56, the optical fiber 52 is bent to form the bend 26. The fluted mouth 58 facilitates the entry of the ends 62, 64 of the optical fiber 52 into the annealing fixture 56 and eases the optical fiber 52 into the bend 26 by preventing the optical fiber 52 from becoming stuck on the walls of the annealing fixture 56. Accordingly, stress levels in the optical fiber 52 are reduced and a uniform bend 66 is formed in the optical fiber.

Figure 5:
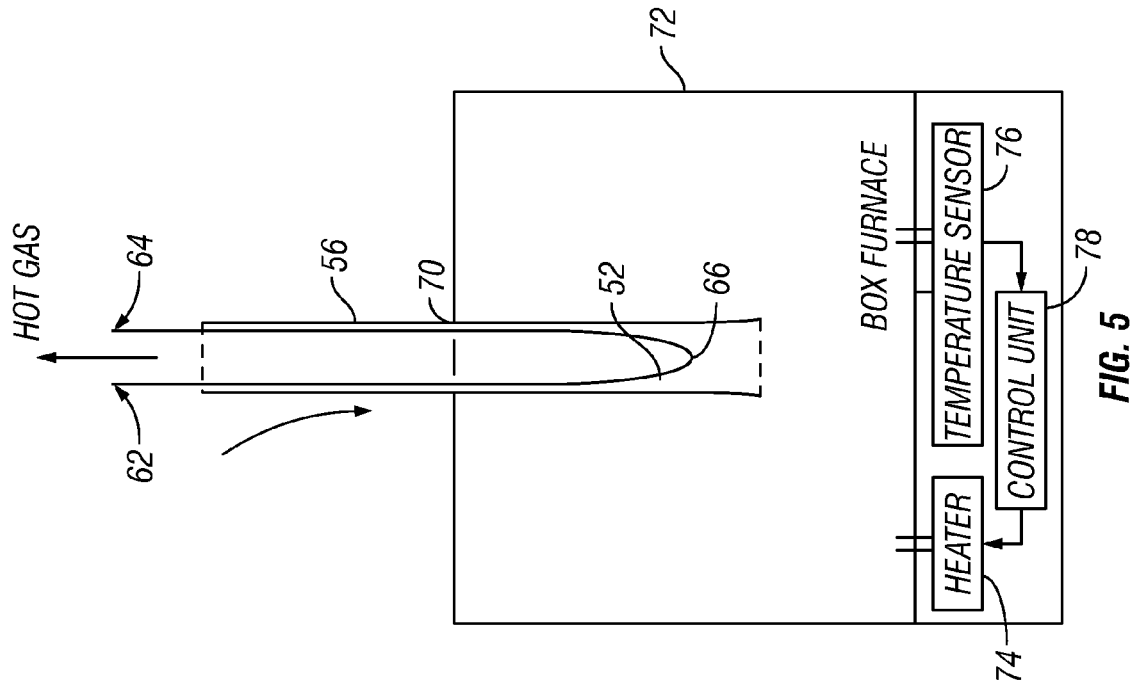
FIG. 5 illustrates the a method of annealing an optical fiber by packaging the optical fiber in the annealing fixture of FIG. 4 and inserting the same into a hole in the top of a box furnace according to one embodiment of the present invention.

Referring again to FIG. 3, at step 68, the bent optical fiber is annealed at process recipe conditions. Referring to FIG. 5, the optical fiber 52 packaged in the annealing fixture 56 is inserted (i.e., as represented by one of the arrows in FIG. 5) into an opening 70 in the top of a box furnace 72. The box furnace 72 includes a heater 74 and a temperature sensor 76 that are in communication with a control unit 78, which regulates the temperature of the box furnace 72 according to the process recipe conditions. The box furnace 72 is filled with a gas, such as air from the ambient atmosphere.

For instance, in a preferred embodiment of the process recipe conditions, the box furnace 72 is slowly heated to 700° C. or higher over a period of 12 hours. As the box furnace 72 operates, heated gas from the box furnace 72 will exit (i.e., as represented by the other arrow in FIG. 5) the opening 70 by passing through the annealing fixture 56. The box furnace 72 is maintained at 300° C. for 12-24 hours to soak the optical fiber 52, which removes or eliminates the stress of the bending process from the optical fiber 52. Then, the temperature of the box furnace 72 is slowly lowered to room temperature over a period of 12 hours.

The slow heating and cooling of the box furnace 72 prevents thermal shock from degrading the integrity of the glass of the optical fiber 52.

The annealing process, as described above, is tightly controlled and reduces or eliminates uncontrolled hot spots. Specifically, the annealing process of the present invention places the optical fiber 52 in a controlled flow of substantially stable temperature gas. In contrast, prior art approaches placed a fiber within a furnace, where the fiber is subject to uneven temperatures of the convection cycle of the box furnace.

In some embodiments, as discussed above, the jacket of the optical fiber 52 is made entirely of metallic components. As a result, the optical fiber 52 is coated with metal before, during and after the annealing process (i.e., permanently).

However, if the jacket of the optical fiber 52 includes non-metallic components, the non-metallic components (i.e., the polymer, such as polyimide) evaporate during the annealing process, leaving a metal coating on the cladding and the core of the optical fiber 52. In other words, the annealing process removes all non-metallic parts, leaving the optical fiber 52 metal coated. It should be appreciated that, since the non-metallic components of the jacket evaporate, the optical fiber 52 does not need to be stripped before being packaged in the annealing fixture 56, which reduces stress in the glass of the optical fiber 52 and saves time by eliminating a mechanical processing step.

The metal coating creates a robust seal around the cladding and the core, which improves the mechanical-integrity and chemical-resistant characteristics of the optical fiber 52.

It should also be appreciated that, since the optical fiber 52 is left with a metallic coating that is robust, the optical fiber 52 does not need to be potted for packaging within the inner sleeve 36 and the outer casing 38.

Referring again to FIG. 3, at step 80, the optical fiber 52 is removed from the annealing fixture 56. The optical fiber 52 is removed by pulling the ends 62, 64 of the optical fiber 52 further outward of the annealing fixture 56 until the optical fiber 52 is free. It should be appreciated that, at this point in the process, the optical fiber 52 has been successfully formed into the turnaround section 24. In some embodiments wherein the optical fiber length was kept in excess of about seven inches (7") for ease of handling, the ends 62, 64 may be trimmed or clipped to a shorter length. In such embodiments, the clipped ends are finished to optical quality in substantial coplanar alignment.

At step 82, the optical fiber 52 that has been annealed is spliced onto the sensing fibers 12, 14. Specifically, as shown in FIG. 1, the ends 20, 22 of the optical fiber 52 (i.e., the turnaround section 24) are fusion spliced to the ends 16, 18 of the sensing fibers 12, 14, respectively. The fusion spliced connections correspond to the splice junctions 32, 32. It should be appreciated that, at this point in the process, the joining of the sensing fibers 12, 14 to the turnaround section 24 corresponds to the sensing fiber assembly 10.

At step 84, the high temperature protectors 34, 34 are attached to the splice junctions 32, 32. As shown in FIG. 2, the high temperature protectors 34, 34 are heat shrunk to the splice junctions 32, 32.

At step 86, the sensing cable 30 is assembled. In particular, as shown in FIG. 2, the sensing fiber assembly 10 with the high temperature protectors 34, 34 is mounted in the inner sleeve 36 such that the turnaround section 24 extends from an open end of the inner sleeve 36. The armor tube 40 is mounted to the inner sleeve 36, about the turnaround section 24, and, then, welded to the inner sleeve 36. The sealing cap 44 is aligned with and, then, welded to the armor tube 40. At which point, the sensing cable 30 is assembled.

It should be understood that the foregoing description is only illustrative of the invention. Various alternatives and modifications can be devised by those skilled in the art without departing from the broader aspects of the present invention.

What is claimed is:

1. An optical sensor package apparatus comprising:
   a first optical fiber extending from a first proximal end to a first distal end;
   a second optical fiber extending from a second proximal end to a second distal end;
   a turnaround optical fiber bent to a U-shape with a minimum bend radius of less than about two tenths of an inch (0.2) between a first turnaround end and a second turnaround end, wherein the turnaround optical fiber is substantially fully annealed and of substantially uniform thickness contiguous with the first and second optical fibers and throughout the U-shape; and
   first and second fused splice junctions joining the respective first and second turnaround ends to the respective first and second proximal ends so as to optically connect the first and second optical fibers via the turnaround optical fiber.

2. An apparatus as claimed in claim 1, wherein the second proximal end is substantially aligned with the first proximal end.

3. An apparatus as claimed in claim 1, wherein the U-shape is substantially hemi-elliptic with a semi-minor diameter of less than about three tenths of an inch (0.3).

4. An apparatus as claimed in claim 1, wherein the minimum bend radius is between about five hundredths of an inch (0.05) and about two hundred thousandths of an inch (0.200).

5. An apparatus as claimed in claim 1, wherein the minimum bend radius is about one tenth of an inch (0.1).

6. A downhole optical sensor package apparatus suitable for high temperature hydrogen environments, comprising:
   a first optical fiber extending from a first proximal end to a first distal end;
   a second optical fiber extending from a second proximal end to a second distal end; and
   a turnaround optical fiber bent to a U-shape with a minimum bend radius of less than about two tenths of an inch (0.2) between a first turnaround end and a second turnaround end, wherein the turnaround fiber is substantially fully annealed and of substantially uniform thickness contiguous with the first and second optical fibers and throughout the U-shape;
   first and second fused splice junctions joining the respective first and second turnaround ends to the respective first and second proximal ends so as to optically connect the first and second optical fibers via the turnaround optical fiber; and a jacket consisting essentially of hydrogen-resistant metal encasing at least the turnaround optical fiber.

7. An apparatus as claimed in claim 6, wherein the jacket includes a polyimide, which substantially entirely evaporates during annealing of the turnaround optical fiber.

8. An apparatus as claimed in claim 6, wherein the hydrogen-resistant metal is selected from one of gold, silver, copper, aluminum, or alloys thereof.

9. An apparatus as claimed in claim 6, further comprising first and second splice protectors each consisting essentially of one or more high temperature polymers, and each positioned around the respective first or second splice junction.

10. An apparatus as claimed in claim 6, wherein the second proximal end is substantially aligned with the first proximal end.

11. An apparatus as claimed in claim 6, wherein the U-shape is substantially hemi-elliptic with a semi-minor diameter of less than about three tenths of an inch (0.3).

12. An apparatus as claimed in claim 6, wherein the minimum bend radius is between about five hundredths of an inch (0.05) and about two hundred thousandths of an inch (0.200).

13. An apparatus as claimed in claim 6, wherein the minimum bend radius is about one tenth of an inch (0.1).

14. An apparatus as claimed in claim 6, further comprising a sleeve surrounding the first fiber and the second fiber and extending from a package end adjacent the first and second proximal ends to a remote end adjacent the first and second distal ends.

15. An apparatus as claimed in claim 14, further comprising an armor tube having an open first end adjacent the minimum bend radius of the turnaround and having a second end sealed to the circumference of the sleeve at an axial region between the package end and the remote end.

16. An apparatus as claimed in claim 15, further comprising an end cap sealed to the first end of the armor tube, whereby the turnaround and the optical fibers are encased by the sleeve, the armor tube, and the end cap.

17. An apparatus as claimed in claim 16, wherein the sleeve, the armor tube, and the end cap consist essentially of high temperature hydrogen-resistant stainless steel pieces that are sealed by welding.

18. An apparatus as claimed in claim 6, wherein the jacket includes a high temperature fiber coating material that operates up to 700° C.

19. An apparatus as claimed in claim 15, wherein the armor tube has a outer diameter that is less than about 5-times the minimum bend radius.

\* \* \* \* \*